(12) United States Patent
Wang

(10) Patent No.: US 10,757,822 B2
(45) Date of Patent: Aug. 25, 2020

(54) REAR SHELL OF DISPLAY DEVICE AND DISPLAY DEVICE

(71) Applicants: K-Tronics (Suzhou) Technology Co., Ltd., Suzhou, Jiangsu (CN); BOE TECHNOLOGY GROUP CO., LTD., Beijing (CN)

(72) Inventor: Changnao Wang, Beijing (CN)

(73) Assignees: K-Tronics (Suzhou) Technology Co., Ltd., Suzhou, Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/415,911

(22) Filed: May 17, 2019

(65) Prior Publication Data

US 2020/0045836 A1  Feb. 6, 2020

(30) Foreign Application Priority Data

Aug. 3, 2018  (CN) .................... 2018 2 1248465 U

(51) Int. Cl.
*H05K 5/00* (2006.01)
*G06F 1/16* (2006.01)

(52) U.S. Cl.
CPC ......... *H05K 5/0017* (2013.01); *G06F 1/1601* (2013.01)

(58) Field of Classification Search
USPC ................... 361/752, 807, 809, 810
See application file for complete search history.

(56) References Cited

U.S. PATENT DOCUMENTS

| | | | | |
|---|---|---|---|---|
| 7,379,302 B2 * | 5/2008 | Cai | ........................... | G06F 1/20 |
| | | | | 174/50 |
| 7,570,318 B2 * | 8/2009 | Li | ...................... | G02F 1/133308 |
| | | | | 349/58 |
| 8,988,868 B2 * | 3/2015 | Harita | ...................... | H05K 5/02 |
| | | | | 361/679.23 |
| 2006/0160382 A1 * | 7/2006 | Nishida | .................... | H05K 1/18 |
| | | | | 439/76.1 |
| 2008/0116045 A1 * | 5/2008 | Matsutani | .............. | H01H 13/50 |
| | | | | 200/293 |
| 2009/0185341 A1 * | 7/2009 | Jang | ..................... | F16M 11/041 |
| | | | | 361/679.22 |

* cited by examiner

*Primary Examiner* — Hung S. Bui
(74) *Attorney, Agent, or Firm* — Foley & Lardner LLP

(57) ABSTRACT

The present disclosure relates to the field of display technology, and particularly to a rear shell of a display device and the display device. The rear shell of the display device includes a top wall and a side wall which are integrally formed. The side wall is provided with a terminal hole which is provided to correspond to a connection terminal disposed on a main board of the display device.

12 Claims, 4 Drawing Sheets

REAR SHELL OF DISPLAY DEVICE AND DISPLAY DEVICE

CROSS REFERENCE

This application is based upon and claims priority to Chinese Patent Application No. 201821248465.9, filed on Aug. 3, 2018, the entire contents thereof are incorporated herein by reference.

TECHNICAL FIELD

The present disclosure relates to the field of display technology, and particularly to a rear shell of a display device and the display device.

BACKGROUND

In the related art, a display device usually adopts a rear shell in a split type which usually includes two parts. One part is a shell body and another part is a terminal hole bracket. The shell body and the terminal hole bracket are matched so that other structures can be connected with a terminal on the main board through a terminal hole of the terminal hole bracket while covering the main board. However, since the shell body and the terminal hole bracket are separately arranged, an assembly of the display device will be more complicated. At the same time, the use of fixing members such as screws is also increased, thus reducing production efficiency of display device and increasing material cost of the display device.

It should be understood that, the information disclosed in the background part above is only provided to facilitate understanding of the background of the present disclosure, and thus may include information which doesn't constitute related technology well-known for those ordinary skilled in the art.

SUMMARY

According to a first aspect of the present disclosure, a rear shell of a display device is provided. The rear shell includes a top wall and a side wall. The side wall and the top wall are integrally formed. The side wall is provided with a terminal hole which is provided to correspond to a connection terminal at a main board of the display device.

In an exemplary arrangement of the present disclosure, the side wall is perpendicular to the top wall.

In an exemplary arrangement of the present disclosure, the side wall is provided to extend obliquely from the top wall in a direction away from the main board.

In an exemplary arrangement of the present disclosure, a local part of the side wall may further be protruded away from the main board to form a protrusion of which a side part is provided with the terminal hole.

In an exemplary arrangement of the present disclosure, the side part of the protrusion is perpendicular to the top wall.

In an exemplary arrangement of the present disclosure, the side part of the protrusion is extended to a bottom end of the side wall.

In an exemplary arrangement of the present disclosure, the rear shell further includes: a connecting wall provided in parallel with the top wall, and one end of the connecting wall adjacent to the main board is connected to a bottom end of the side wall.

In an exemplary arrangement of the present disclosure, the rear shell further includes a supporting wall provided perpendicular to the connecting wall. One end of the supporting wall is connected to one end of the connecting wall away from the main board to form an L-shape with the connecting wall.

In an exemplary arrangement of the present disclosure, the top wall, the side wall, the connecting wall and the supporting wall are integrally formed.

In an exemplary arrangement of the present disclosure, the rear shell may be a plastic rear shell.

In an exemplary arrangement of the present disclosure, a shape of the terminal hole is corresponding to the shape of the connection terminal and may be circular, rectangular or kidney-shaped.

According to a second aspect of the present disclosure, a display device is provided. The display device includes a back plate, a main board, and a rear shell of above arrangements. The main board mounted on the back plate and provided with a connection terminal. The rear shell covered the main board and connected to the back plate.

In an exemplary arrangement of the present disclosure, the back plate includes a reinforcing rib which is provided with an annular shape and is arranged around the rear shell.

In an exemplary arrangement of the present disclosure, the rear shell may be abutted against the inner side of the reinforcing rib.

It should be understood that the above general description and the following detailed description are intended to be illustrative and explanatory and do not limit the disclosure.

BRIEF DESCRIPTION OF THE DRAWINGS

Herein the drawings that are incorporated into the description and constitute a part of the present description illustrate arrangements in accordance with the present disclosure, and are used for explaining principle(s) of the present disclosure together with the description. It should be understood that the following drawings merely illustrate some arrangements of the present disclosure, from which other alternatives can be derived without any creative works for those ordinary skilled in the art.

DETAILED DESCRIPTION

Figure 1:
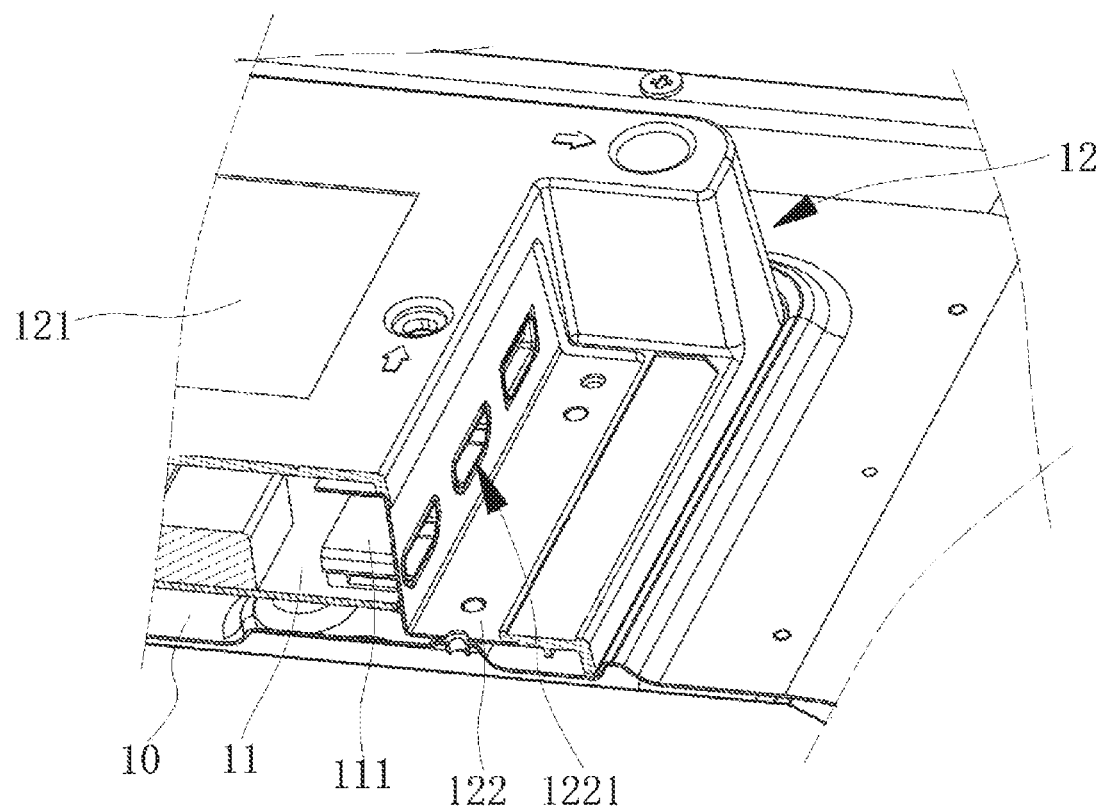
FIG. 1 is a schematic diagram illustrating part structure of a rear shell, a back plate and a main board after assembly in a display device of the related art.

Exemplary arrangements will now be described more fully with reference to the accompanying drawings. However, the exemplary arrangements can be implemented in various forms and should not be constructed as being limited to the arrangements described herein. On the contrary, providing these arrangements enables the present disclosure to be comprehensive and complete, and the concept of the exemplary arrangements to be fully communicated to those skilled in the art. The same reference numbers in the drawings denote the same or similar parts, and thus the detailed description will be omitted.

Although the relative terms such as "upper" and "lower" are used in the instructions to describe the relative relationship of one component of the icon to another component, however, these terms are used in this instruction for convenience only, for example, the direction of one example is described according to the drawing. It should be understood that if the device as shown in the drawings is flipped and turned upside and down, the component described "upper" will become the component "below". When a structure is "on" another structure, it may indicate that a structure is integrally formed on another structure, or that a structure is "directly" configured on another structure, or that a structure is "indirectly" configured on other structure through another structure.

The terms "a", "an", "the", "described" and "at least one" are used to express the presence of one or more elements/part/etc., the terms "include" and "provide" are used to express the meaning of the open inclusive, and also include additional elements/component/etc., in addition to the listed elements/component/etc.

In the related art, as shown in FIG. 1, a display device adopts a rear shell 12 in a split type which usually includes two parts. One part is a shell body 121 and the other part is a terminal hole bracket 122. The shell body 121 and the terminal hole bracket 122 are matched so that other structures can be connected with a connection terminal 111 on the main board 11 through a terminal hole 1221 of the terminal hole bracket 122. However, since the shell body 121 and the terminal hole bracket 122 are separately arranged, when the display device is assembled, the main board 11 is first mounted on the back plate 10 and fixed with screws, and the terminal hole bracket 122 is then mounted on the back plate 10 and fixed with the screws. Then, the rear shell 12 is covered, and the rear shell 12 is fixedly connected to the back plate 10 and the terminal hole bracket 122 by the screws. Therefore, the shell body 121 and the terminal hole bracket 122 are separately arranged, which may cause that an assembly of the display device will be more complicated. At the same time, the use of fixing members such as the screws is also increased, thus reducing the production efficiency of the display device and increasing the material cost of the display device.

The arrangement of the present disclosure provides a rear shell of a display device applied to the display device. As shown in FIG. 2 to FIG. 6, the rear shell 22 can be covered at a main board 21 of the display device and is connected to a back plate 20. In other words, the rear shell 22 is covered on the back plate 20 and is enclosed with the back plate 20 to form a containing cavity. The main board 21 is located in the containing cavity.

Specifically, the rear shell 22 includes a top wall 221 and a side wall 222, and the side wall 222 is provided with a terminal hole 2222 which is provided to correspond to a connection terminal 211 at the main board 21, so that other structures (for example, external terminals) are connected to the connection terminal 211 through the terminal hole 2222.

The side wall 222 and the top wall 221 are integrally formed, that is, the rear shell 22 of the display device of the present arrangement is an integrated structure. When the display device is assembled, the main board 21 is first mounted at the back plate 20 and fixed with the screws. Then, the integrally formed rear shell is covered on, and the rear shell 22 is fixedly connected to the back plate 20 by the screws. Thus, compared with the display device shown in FIG. 1, a step of connecting the terminal hole bracket 122 to the shell body 121 or the back plate 10 can be omitted. Since the step of connecting the terminal hole bracket 122 to the shell body 121 or the back plate 10 is omitted and the rear shell 22 is integrally formed, in the present arrangement, assembly man-hour of the display device can be saved and the use of the fixing members (for example, screws, etc.) can be saved, thus improving the assembly efficiency of the display device and reducing the material cost of the display device. In addition, since the rear shell 22 of the present disclosure is integrally formed, the present arrangement may further reduce amount of material used to make the rear shell 22, and thus further reducing the material cost of the display device compared with the display device in FIG. 1.

Specifically, the rear shell 22 may include the top wall 221 and an annular wall. The top wall 221 may be a flat plate structure of which the shape is provided as a rectangular shape or an irregular shape. The top wall 221 is provided opposite to the main board 21 and parallel to each other, and the annular wall and the top wall 221 are integrally formed. And the annular wall is enclosed with the top wall 221 to form a containing cavity, and an open end of the containing cavity is covered by the back plate 20, and the main board 21 is mounted on the back plate 20 and located in the containing cavity.

In the arrangement, a part of the annular wall adjacent to the connection terminal 211 may be the side wall 222 which is provided with the terminal hole 2222 corresponding to the connection terminal 211. The shape of the terminal hole 2222 may be circular, rectangular or kidney shape, etc., depending on the shape of the connection terminal 211. That is, when a cross-sectional shape of the connection terminal 211 is circular, the shape of the terminal hole 2222 is further circular.

It should be noted that the area of the terminal hole 2222 may be slightly larger than the cross-sectional area of the connection terminal 211, so that the connection terminal 211 protrudes into or protrudes out the terminal hole 2222 and is connected to other structures.

For example, the rear shell 22 may further include a connecting wall 223 and a supporting wall 224. The connecting wall 223 is provided in parallel with the top wall 221, and one end of the connecting wall 223 is connected to a bottom end of the side wall 222, and another end is connected to the supporting wall 224. The supporting wall 224 may be provided perpendicular to the connecting wall 223 and supported at the back plate 20. That is to say, the connecting wall 223 is connected to the supporting wall 224 to form an L-shape, thus, while the rear shell 22 is supported by the back plate 20, it is further possible to prevent the rear shell 22 interfering with a protruding part on the back plate 20 when the rear shell 22 is covered on the back plate 20.

In the arrangement, the top wall 221, the side wall 222, the connecting wall 223 and the supporting wall 224 are integrally formed.

In addition, the rear shell 22 may be formed of plastic material by injection molding, That is to say, the rear shell 22 may be a plastic rear shell. On the one hand, weight of the display device can be reduced, and on the other hand, the rear shell 22 may be provided with a certain elasticity to facilitate the assembly of the rear shell.

In general, considering effect of terminals on the main board 21 or protruding structures on the back plate 20 on the rear shell 22 assembled laterally the back plate 20 from a lateral direction. That is, when the rear shell 22 is assembled to the back plate 20 from the lateral direction (that is, a direction parallel to the top wall 221), the rear shell 22 is interfered with the protruding structures on the terminals or the back plate 20 on the main board 21. Therefore, in the present arrangement, the rear shell 22 may be assembled to the back plate 20 from a vertical direction (that is, a direction perpendicular to the top wall 221).

Figure 3:
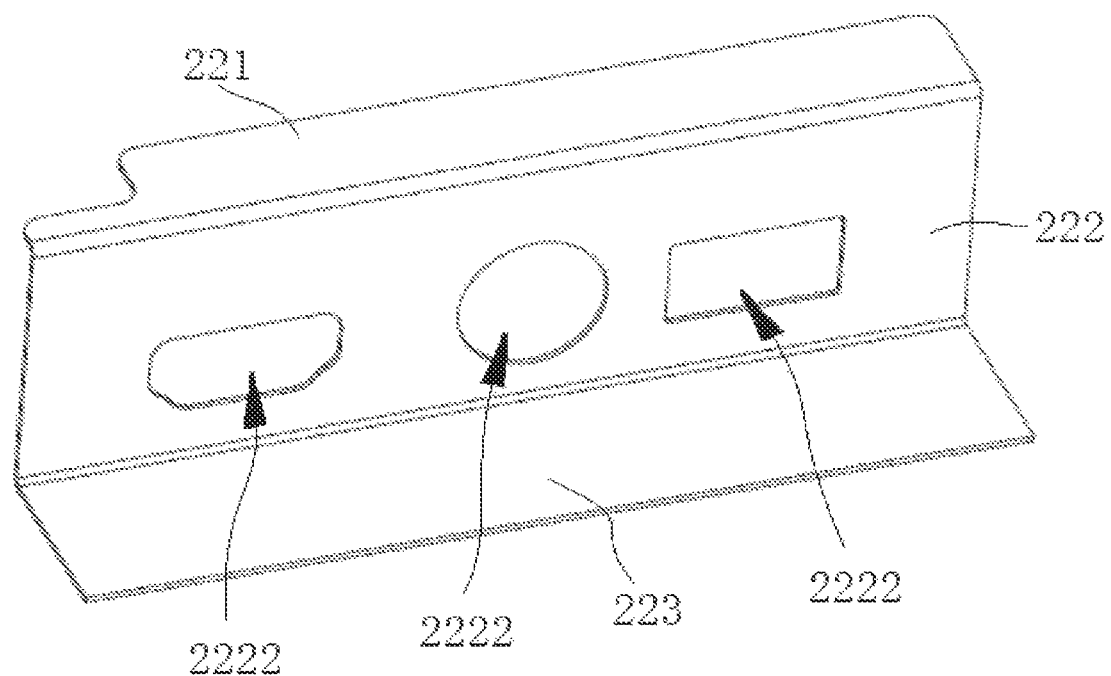
FIG. 3 is a schematic diagram illustrating part structure of the rear shell in the display device of the arrangement of the present disclosure.
Figure 4:
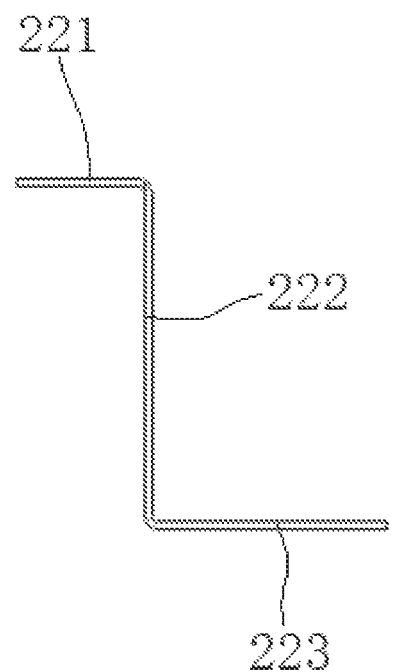
FIG. 4 is a side view of the rear shell in FIG. 3.

In the arrangement, as shown in FIG. 3 and FIG. 4, the side wall 222 of the rear shell 22 may be disposed perpendicular to the top wall 221. the rear shell 22 is adapted to cover the main board 21 of which length of the connection terminal 211 protrudes out a board edge is less than or equal to 2 mm. By arranging the side wall 222 of the rear shell 22 perpendicularly to the top wall 221, it is possible to prevent the rear shell 22 interfering with the connection terminal 211 on the main board 21 when the rear shell 22 is assembled to the back plate 20 from the vertical direction, and the material for forming the rear shell 22 can further be saved to reduce the material cost of the rear shell 22.

Figure 5:
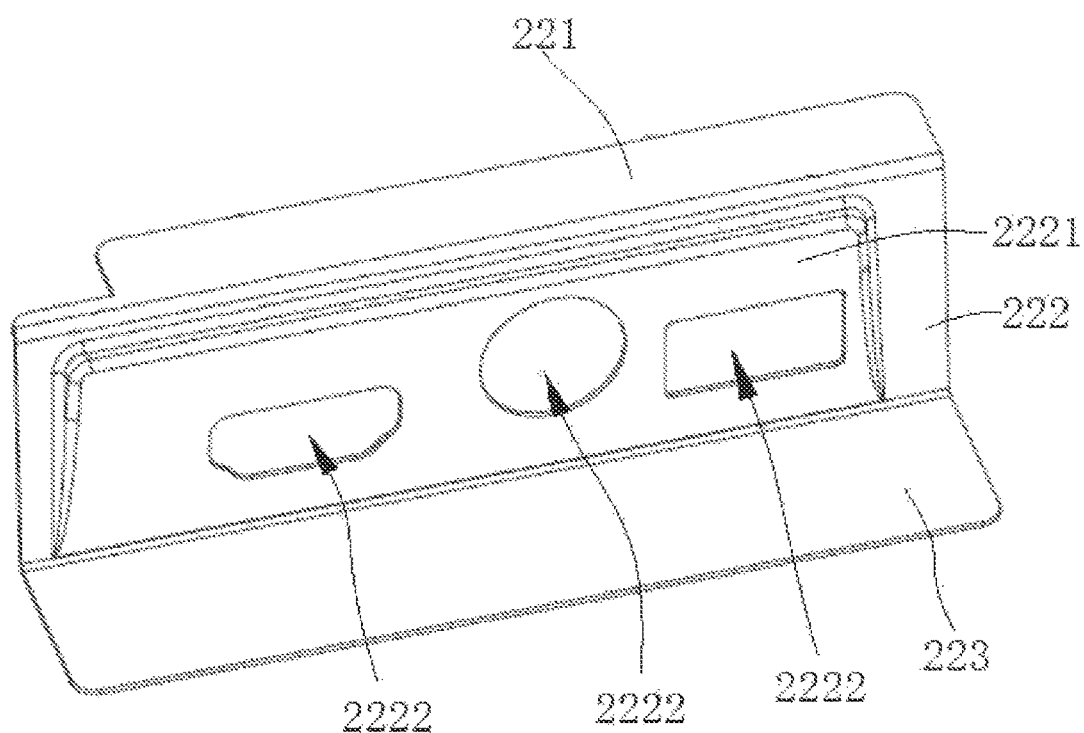
FIG. 5 is a schematic diagram illustrating part structure of the rear shell in the display device of another arrangement of the present disclosure.
Figure 6:
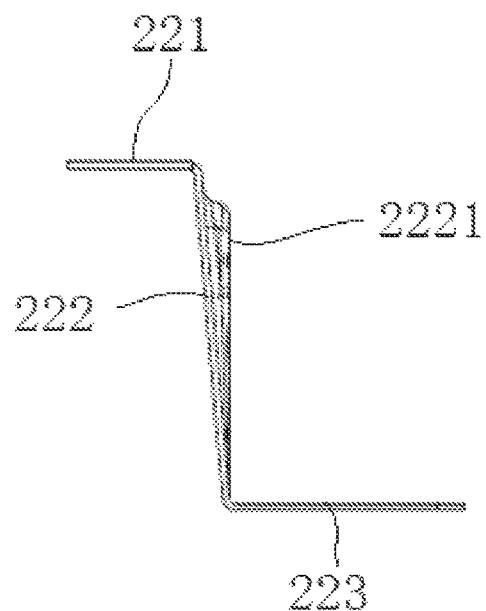
FIG. 6 is a side view of the rear shell in FIG. 5.

In another arrangement, as shown in FIG. 5 and FIG. 6, the top end of the side wall 222 of the rear shell 22 is connected to the top wall 221. The bottom end of the side wall 222 is inclined away from the main board 21, that is, the side wall 222 is provided to extend obliquely from the top wall 221 in a direction away from the main board. That is, when the top end of the side wall 222 is connected to the edge of the top wall 221, the bottom end of the side wall 222 is inclined away from the top wall 221. Since the bottom end of the side wall 222 is inclined away from the main board 21, a gap between the side wall 222 and the main board 21 is increased. Therefore, the rear shell 22 is not only suitable for covering the main board 21 of which the length of the connection terminal 211 protrudes out the board edge is less than or equal to 2 mm, but also suitable for covering the main board 21 of which the length of the connection terminal 211 protrudes out the board edge is greater than 2 mm. For example, it is suitable for the main board 21 which is provided with an RF terminal, that is, the rear shell 22 is suitable for the main board 21 of various specifications, which improves versatility of the rear shell 22.

In the arrangement, when the bottom end of the side wall 222 is inclined away from the top wall 221, a local part of the side wall 222 may further be protruded away from the main board 21 to form a protrusion of which a side part 2221 is provided with a terminal hole 2222. A gap distance (the gap distance is a dimension in a direction parallel to the top wall 221) between the terminal hole 2222 and the main board 21 may be increased by forming the protrusion, thus alleviating the case that the local part of the connection terminal 211 protrudes out the terminal hole 2222 when the rear shell is covered on the back plate 20. In this way, while improving appearance quality of the display device, it is further possible to alleviate the case that collision of external object with the connection terminal 211 causes the connection terminal 211 to be damaged, thus prolonging service life of the connection terminal 211. Wherein the side part of the protrusion is a wall of a side surface of the protrusion.

In the arrangement, the side part 2221 of the protrusion is vertically arranged in the direction perpendicular to the top wall 221, and the side part 2221 of the protrusion is perpendicular to the top wall 221. Specifically, an inner surface (the inner surface is a surface of the side part 2221 closing to the main board 21) and an outer surface (the outer surface is a surface of the side part 2221 away from the main board 21) of the side part 2221 of the protrusion are vertical planes to ensure that gap distances between all parts of the terminal hole 2222 and the main board 21 are consistent, so that sizes of all parts of the connection terminal 211 extended into the terminal hole 2222 are the same.

It should be noted that when the connecting terminal 211 is an RF terminal, the RF terminal protrudes out the terminal hole 2222. By vertically arranging the side part 2221 of the protrusion in the direction perpendicular to the top wall 221, it is ensured that the sizes of all parts of the RF terminal extended out the terminal hole 2222 are the same to ensure connection stability of the RF terminal with other structures. In addition, appearance texture of the display device can be ensured and user experience can be improved.

Further, the side part 2221 of the protrusion is extended to the bottom end of the side wall 222. That is to say, a bottom end surface of the side part 2221 is a part of the bottom end surface of the side wall 222, so that most of the outer surfaces of the side wall 222 are vertical planes, and remaining small part are inclined planes. The inclined planes are matched with the draft inclined planes of a front mold in an injection mold (the front mold is configured to machine the outer surfaces of the rear shell 22)

Since the most of outer surfaces of the side wall 222 in the present arrangement are vertical planes, the front mold of the injection mold (the front mold is a mold for forming the out surfaces of the rear shell 22) for machining the rear shell 22 can further be used to machine the rear shell 22 of which the top wall 221 is perpendicular to the side wall 222. That is to say, after the rear shell 22 of which the top wall 221 is perpendicular to the side wall 222 is machined by the injection mold, in order to use the injection mold to machine the rear shell 22 of which the bottom end of the side wall 222 is inclined away from the top wall 221, only a rear mold is needed to be replaced (the rear mold is a mold for forming inner surfaces of the rear shell 22), and there is no need to replace the front mold. In this way, while ensuring that machined rear shell 22 satisfies structural function requirement and gap requirement, productivity of the injection mold is increased, and cost of the injection mold is reduced.

Figure 2:
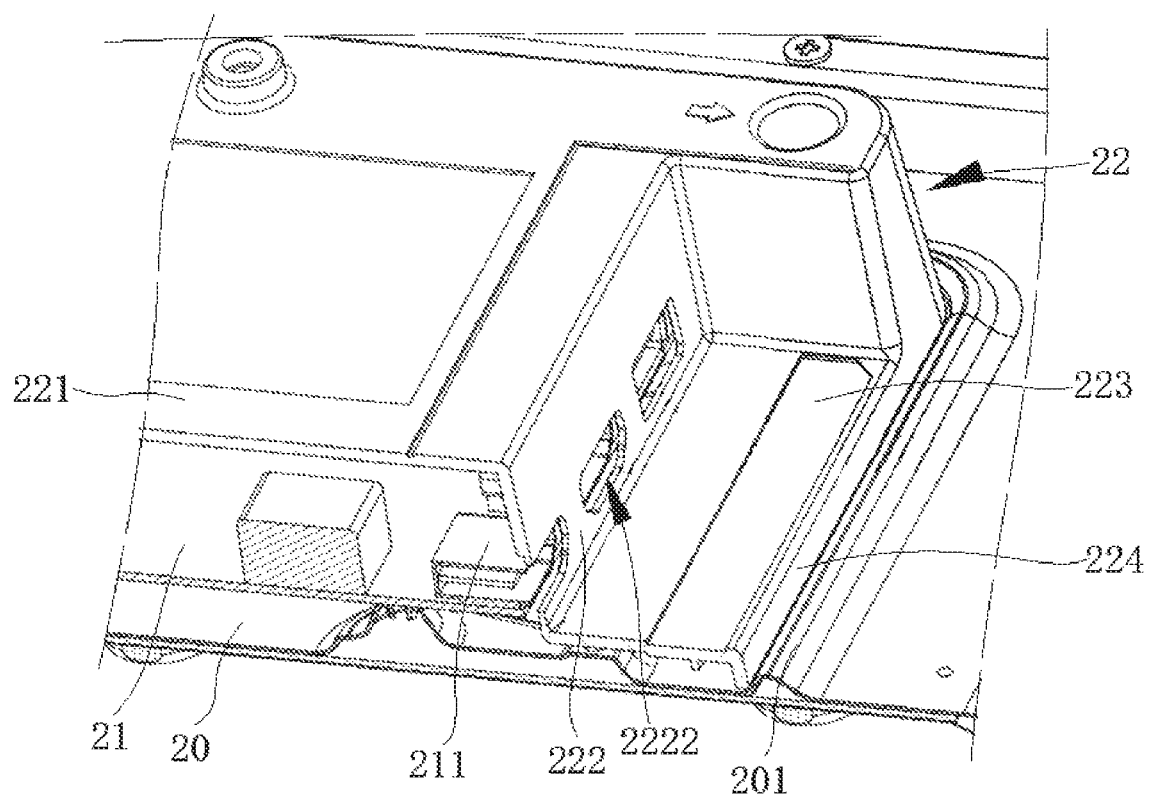
FIG. 2 is a schematic diagram illustrating part structure of a rear shell, a back plate and a main board after assembly in the display device of the arrangement of the present disclosure.

In addition, the arrangement of the present disclosure further provides a display device which can be applied to electronic devices such as computers, mobile phones and televisions. As shown in FIG. 2, the display device of the arrangement of the present disclosure may include a back plate 20, a main board 21 and a rear shell 22 according to any one of the above arrangements. Wherein the back plate 20 is a part of a backlight module in the display device, and the back plate 20 may be an iron back plate. That is, the back plate 20 may be made of iron materials to improve heat dissipation efficiency of the back plate 20. Of course, the back plate 20 may further be made of other metal materials. The main board 21 may be mounted on the back plate 20, and the main board 21 is provided with a connection terminal 211 of which the number may be one, two or more. Wherein the connection terminal 211 may be a USB (Universal Serial Bus) terminal, an HDMI (High Definition Multimedia Interface) terminal, or an RF (Radio Frequency) terminal. The rear shell 22 may be cover the main board 21 of the display device and is connected to the back plate 20, and a terminal hole 2222 at the rear shell is corresponding to the connection terminal 211.

As shown in FIG. 2, the back plate 20 may include a reinforcing rib 201 which may be formed by local part of the back plate 20 protruding toward the rear shell 22 to enhance structural strength of the back plate 20.

In the arrangement, the reinforcing rib 201 may be provided with an annular shape, and the reinforcing rib 201 is arranged around the rear shell 22. In this way, while strengthening the structural strength of the back plate 20, joints between the rear shell 22 and the back plate 20 may be laterally shielded to ensure that lateral appearance of the display device is an entire surface, thus improving the structural stability and the appearance texture of the display device, and meeting requirements of the customer.

In addition, the rear shell 22 may be abutted against the inner side of the reinforcing rib 201, so that the reinforcing rib 201 is further provided with a function of limitation to alleviate lateral movement of the rear shell 22 and the back plate 20, and to improve assembly stability of the rear shell 22 and backing plate 20.

The rear shell of the display device and the display device provided by the present disclosure, the rear shell includes the top wall and the side wall, and the side wall is provided with the connection terminal corresponding to the connection terminal, so that other structures are connected to the connection terminal through the terminal hole. And the side wall and the top wall are integrally formed. That is, the rear shell of the display device of the present disclosure is the integrated structure, so that compared with the related art in which the display device adopts the rear shell in a split type, the step of connecting the terminal hole bracket to the shell body or the back plate can be omitted. Since the step of connecting the terminal hole bracket to the shell body or the back plate is omitted, the assembly man-hour of the display device can be saved and the use of the fixing members (for example, screws, etc.) can be saved, thus improving the assembly efficiency of the display device and reducing the material cost of the display device. In addition, since the rear shell of the present disclosure is integrally formed, compared with a scheme in which the display device adopts the rear shell in a split type in the related art, it can further reduce the amount of material used to make the rear shell, thus further reducing the material cost of the display device.

By considering the specification and upon implementing the disclosure herein, those skilled in the art can easily conceive of other arrangements of the present disclosure. The present disclosure is intended to cover all variations, purposes or adaptive modifications of the present disclosure, which should be in accordance with the general principle of the present disclosure and should encompass common knowledge or conventional technical means not disclosed in the present disclosure. The description and the arrangements are merely deemed as illustrative, and the true scope and spirit of the present disclosure are indicated by the appended claims.

What is claimed is:

1. A rear shell of a display device comprising:
   a top wall; and
   a side wall, wherein the side wall and the top wall are integrally formed, and the side wall extends obliquely from the top wall in a direction away from a main board, a local part of the side wall further protrudes away from the main board and forms a protrusion, a side part of which is provided with a terminal hole, which corresponds to a connection terminal disposed on the main board of the display device, the side part of the protrusion is perpendicular to the top wall.

2. The rear shell according to the claim 1, wherein the side part of the protrusion is extended to a bottom end of the side wall.

3. The rear shell according to the claim 1, wherein the rear shell further comprises:
   a connecting wall provided in parallel with the top wall, and one end of the connecting wall adjacent to the main board is connected to a bottom end of the side wall.

4. The rear shell according to the claim 3, wherein the rear shell further comprises:
   a supporting wall provided perpendicular to the connecting wall, one end of the supporting wall is connected to one end of the connecting wall away from the main board to form an L-shape with the connecting wall.

5. The rear shell according to the claim 4, wherein the top wall, the side wall, the connecting wall and the supporting wall are integrally formed.

6. The rear shell according to the claim 1, wherein the rear shell may be a plastic rear shell.

7. The rear shell according to the claim 1, wherein a shape of the terminal hole is corresponding to the shape of the connection terminal, which is circular, rectangular or kidney-shaped.

8. A display device comprising:
   a back plate;
   a main board mounted on the back plate and provided with a connection terminal; and
   a rear shell covered the main board and connected to the back plate; wherein
   the rear shell comprises:
      a top wall; and
      a side wall, wherein the side wall and the top wall are integrally formed, and the side wall extends obliquely from the top wall in a direction away from the main board, a local part of the side wall protrudes away from the main board and forms a protrusion, a side part of which is provided with a terminal hole, corresponds to the connection terminal, the side part of the protrusion is perpendicular to the top wall.

9. The display device according to the claim 8, wherein the back plate comprises a reinforcing rib which is provided with an annular shape and is arranged around the rear shell.

10. The display device according to the claim 9, wherein the rear shell is abutted against the inner side of the reinforcing rib.

11. The display device according to the claim 8, wherein the side part of the protrusion is extended to a bottom end of the side wall.

12. The display device according to the claim 8, wherein the rear shell further comprises:
   a connecting wall provided in parallel with the top wall, and one end of the connecting wall adjacent to the main board is connected to a bottom end of the side wall.

* * * * *